(No Model.)

G. F. DIECKMANN.
ELECTRIC EARTH BATTERY.

No. 329,724. Patented Nov. 3, 1885.

Witnesses
Geo. W. Breck.
Chas. J. Maguire.

Inventor
Geo. F. Dieckmann
By his Attorneys
Curtis & Crocker

UNITED STATES PATENT OFFICE.

GEORGE F. DIECKMANN, OF NEW YORK, N. Y., ASSIGNOR OF ONE-FOURTH TO PAUL GMEHLIN, OF SAME PLACE.

ELECTRIC EARTH-BATTERY.

SPECIFICATION forming part of Letters Patent No. 329,724, dated November 3, 1885.

Application filed June 15, 1885. Serial No. 168,690. (No model.)

*To all whom it may concern:*

Be it known that I, GEORGE F. DIECKMANN, a citizen of Germany, residing in the city, county, and State of New York, have invented a new and useful Electric Earth-Battery, of which the following is a specification.

Earth-batteries, consisting of electrodes buried in the earth, as heretofore constructed, have not been capable of giving an electro-motive force greater than that obtainable from a single couple—which is too small for practical purposes—because, if a number of couples or elements were used and connected in series all the couples stood in the same electrolyte and short-circuited one another. By my invention I am enabled to bury a series of couples in the same body of earth and connect them together in series, so as to obtain from such a battery an indefinitely high electro-motive force sufficient for charging storage-batteries, operating electric bells, telegraphic and other purposes, &c.

To this end my invention consists in arranging the electrodes in such a way that the resistance between the electrodes of each couple is small, while the resistance between the couples is relatively large, and connecting the negative electrode of each with the positive electrode of the next by a low-resistance conductor, so that the short-circuiting effect of the couples upon each other may be indefinitely reduced, and the effect is practically the same as if the couple were immersed in separated electrolytes. To arrange the relative resistances so as produce this effect I place the two electrodes of each couple comparatively near together, and the separate couples relatively far apart, so that the resistance between one electrode of one couple and the same electrode of the next couple is very much greater than the resistance between the two electrodes of the same couples, and consequently the short-circuiting effect is reduced comparatively to nothing.

Figure 1:
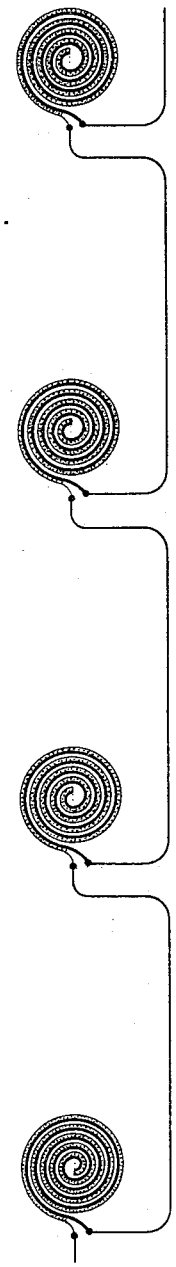
Figure 2:
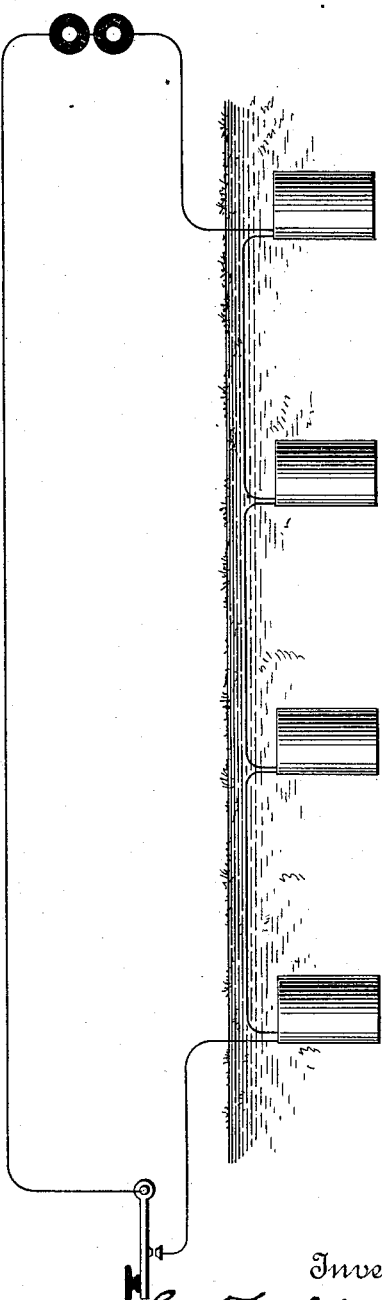

My invention is illustrated in the accompanying drawings, Figure 1 representing my arrangement of electrodes in plan, and Fig. 2 showing them in elevation buried in the earth.

In my battery any electrodes may be used, and they may be of any desired size and shape; but in order to make the internal resistance of the battery as low as possible and obtain a cheap construction, I prefer to form each element or couple of zinc and copper plates or sheets separated the proper distance by a sheet of felt, asbestus, or other suitable non-conducting material and rolled up in a spiral form, as clearly represented in the drawings, by which means I obtain a compact element having a large surface with a small distance between the plates, and consequently a very low resistance. The zinc plate being the one most acted upon should be made the thicker, as I have indicated. Having constructed any desired number of these elements according to the electro-motive required, I bury them in the earth at a proper depth in any desired positions, but relatively far apart, so that the distance between them is great compared with the distance between the two electrodes of any one couple. The negative plate of each couple is then connected with the positive plate of the next through the series, as represented—and the terminals of the battery thus formed are connected with the circuit to be supplied, a telegraph-circuit, as represented, for example. The wires connecting the couples should preferably be insulated where they come near together below ground, to prevent short-circuiting there. I have shown them entirely buried in the earth; but of course they may be laid above ground. The distance apart that the couples should be placed depends upon the resistance of the telegraphic or other working circuit. If its resistance be very high, then the couples should be much farther apart, in order that the difference of potential between one electrode of one couple and the same electrode of the next couple may be high compared with the difference of potential between the two electrodes of the same couple. Similarly, the end couples of the battery should be so far apart with reference to the resistance of the working-circuit that the resistance between them through the earth is great compared with the resistance of the working-circuit, so that the working-circuit will not be short-circuited; or, to express it more accurately, the earth-resistance between the end couples should be so high that the fall of potential through it is great compared with the fall through the working-circuit. This effect is obtained by making the distance between the end couples correspondingly greater than that between adjacent couples—by arranging the couples in a straight line, for example. By thus properly proportioning the resistance between the couples to the circuit-resistance and internal resistance of the couples, the short-circuiting effect may be reduced more or less to an insignificant amount, and any desired electro-motive force obtained from the battery.

I claim as my invention—

1. An earth-battery consisting of a number of couples or elements buried in the earth and connected in series, the two electrodes of each couple being placed near together, while the couples or elements are placed comparatively far apart, whereby the short-circuiting effect of the couples upon each other is avoided, and an indefinitely high electro-motive force obtained.

2. An earth-battery consisting of a number of couples or elements composed of sheet-electrodes rolled up in a spiral form and buried in the earth and connected in series, the couples being arranged comparatively far apart, whereby the short-circuiting effect of the couples upon each other is avoided.

June 12, 1885.

GEORGE F. DIECKMANN.

Witnesses:
FRANCIS B. CROCKER,
CHAS. J. MAGUIRE.